March 25, 1952     A. A. HAMER     2,590,533
HANGER CONSTRUCTION FOR SUPPORTING MEAT HOOKS
Filed Feb. 23, 1951     3 Sheets-Sheet 1

A. A. Hamer
INVENTOR,
BY *C. A. Snow & Co.*
ATTORNEYS.

March 25, 1952 A. A. HAMER 2,590,533
HANGER CONSTRUCTION FOR SUPPORTING MEAT HOOKS
Filed Feb. 23, 1951 3 Sheets-Sheet 2
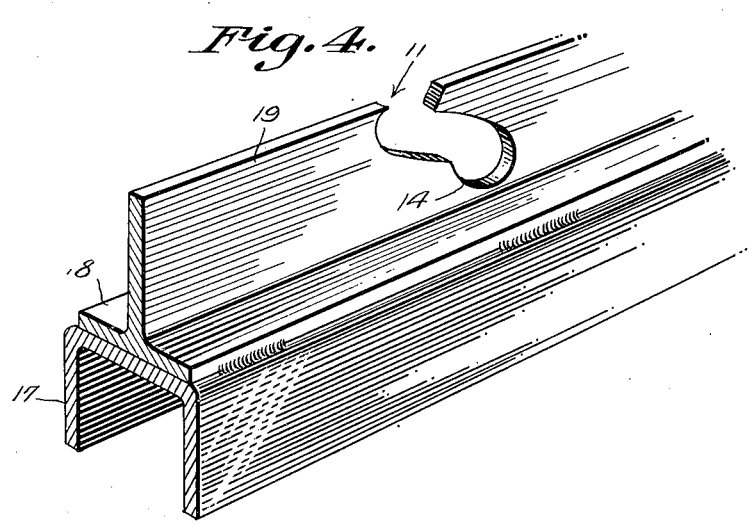
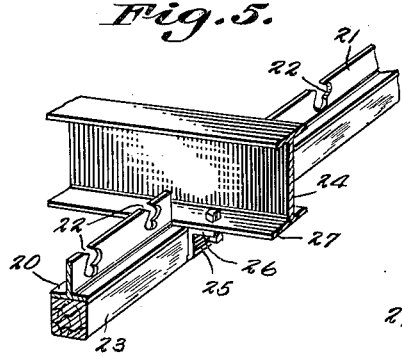
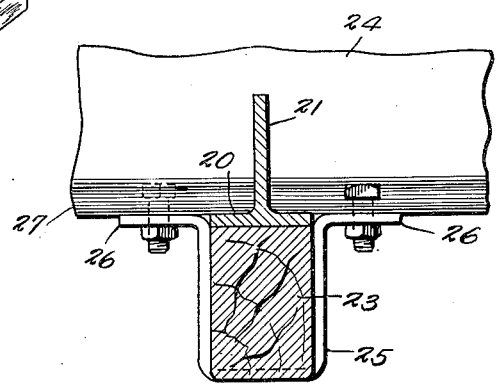
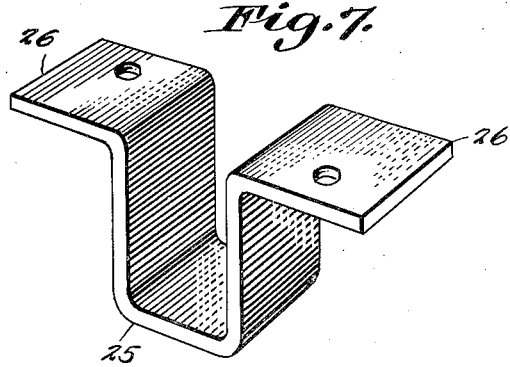
A. A. Hamer
INVENTOR,
BY C. A. Snow & Co.
ATTORNEYS.

Patented Mar. 25, 1952

2,590,533

UNITED STATES PATENT OFFICE 2,590,533

HANGER CONSTRUCTION FOR SUPPORTING MEAT HOOKS

Alfred A. Hamer, Alexandria, Va.

Application February 23, 1951, Serial No. 212,352

4 Claims. (Cl. 211—113)

This invention relates to improved meat hook supporting rails, the primary object of the invention being to provide a rail provided with slots arranged in the upper surface thereof, the slots being so constructed that they will receive and secure meat hooks to hold the meat hooks, together with their loads, against accidental displacement, the supporting rails being primarily constructed for use in refrigerator cars. However due consideration has been given to the use of the supporting rail for trucks, ships or other storage spaces wherein meat carcasses and large cuts of meat are suspended from overhead rails or beams, and wherein the meat carcasses or cuts of beef are subjected to jars and jolts, incident to transporting the carcasses or cuts of meat, to the end that the hooks supporting the meat carcasses or cuts of beef will not become accidentally displaced which usually results in the tearing and falling of meat to the floor due to the bouncing movement or complete displacement of hooks, on the overhead rails which results in the bruising and scuffing of the beef cuts.

An important object of the invention is to provide receiving notches in the supporting rails which are so constructed and arranged that they will absolutely prevent accidental displacement or upward bouncing of the hooks positioned therein, but at the same time afford a structure to permit of conventional type hooks being readily positioned within the notches with the minimum amount of effort on the part of the operator, the notches being so spaced that the meat hooks can be positioned therein to afford the most effective use of available loading space.

Still another object of the invention is to provide a supporting rail having hook-receiving and securement notches, the rail being constructed to fit over the usual wooden beams or meat rails commonly employed in refrigerator car construction for supporting hooks, thereby converting the usual wooden meat rails into metallic supporting rails provided with notches constructed in accordance with the present invention, which construction also provides a rail reinforcement eliminating the frequent breakages of meat rails occurring by the use of wooden rails.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Fig. 4 is a fragmental perspective view illustrating a modified form of metal supporting meat rail.

Fig. 5 is a perspective view illustrating a metal supporting rail constructed for positioning over wooden meat rails of a refrigerator car.

Fig. 6 is an end elevational view of a metallic supporting rail mounted on the usual wooden meat rails of a refrigerator car.

Fig. 7 is a perspective view illustrating one of the metal straps employed in connecting a combined wooden and metal meat rail, to an I-beam extending transversely of a car providing a support for the meat rails.

Figure 1:
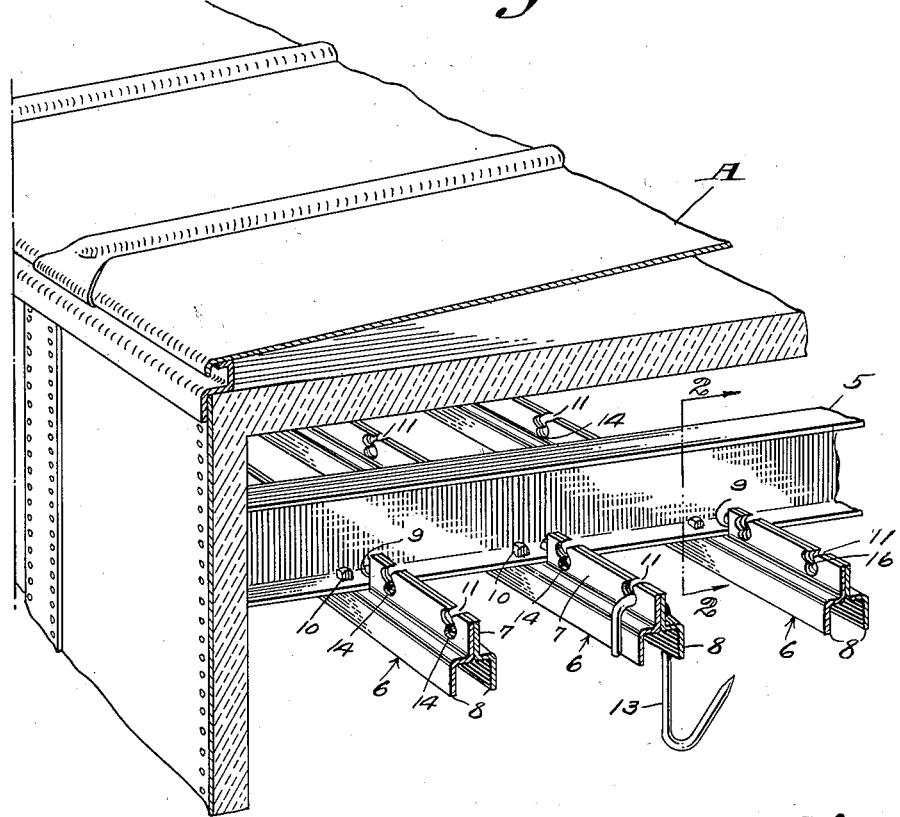
Figure 1 is a fragmentary perspective view illustrating a refrigerator car equipped with metallic meat supporting rails constructed in accordance with the invention.
Figure 2:
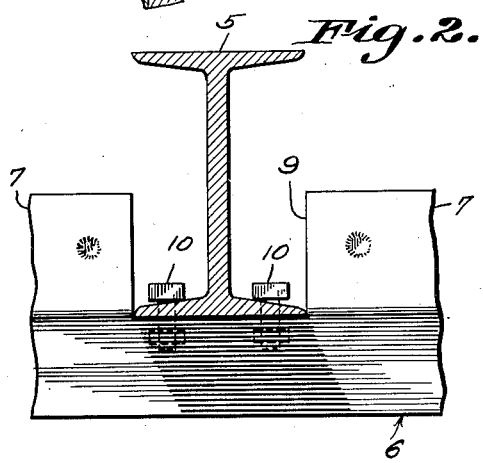
Fig. 2 is a sectional view taken on line 2—2 of Fig. 1.

Referring to the drawings in detail, the reference character A indicates a section of a refrigerator car in which suitable transoms 5 are mounted, the transoms 5 being of I-beam construction.

These transoms 5 are arranged in parallel spaced relation with respect to each other thruoghout the length of the car, and provide supports for the hook-supporting rails 6, each of which comprises lengths of heavy sheet metal material bent to provide a longitudinally disposed flange 7 with L-shaped portions 8, the longitudinally disposed flanges being welded together in such a way that the L-shaped portions 8 thereof provide a substantially U-shaped lower edge which provides a structure against which the ends 8' of the hooks rest, holding the hooks against lateral or sidewise swinging on the supporting rail.

The flanges 7 of the rails are formed with cut-away portions 9 so that they will fit against the lower flanges of the transoms, where the rails are bolted to the lower flanges of the transoms, as by means of bolts 10, securely fastening the hook-supporting rails 6, to the transoms.

The longitudinally disposed flange of each hook-supporting rail, is provided with spaced notches extending inwardly from the upper edge thereof, the spaced notches being so contrasted that they provide an entrance section 11, the wall 12 thereof being curved so that hooks such as indicated by the reference character 13 may be positioned within the entrance section, the hooks striking the curved walls 12 to be guided to the lower end of the notches or slots. The inner end walls of these notches, are curved at 14, the curved inner ends of the notches providing seats in which the hooks rest, the seats being slightly offset downwardly, with respect to the walls 15 of the notches which are parallel for a substantial length of the notches. Due to this construction, it will be seen that a guarding portion 16 is provided and comprises a part of each notch construction, the guarding portions of the notches overlying the hook seats or curved portions 14, to the end that upon vertical movement of a hook positioned in a notch, due to vibrations, the hook will contact with the guarding portion 16 to the end that displacement of the hook by a direct vertical movement caused by severe switching impacts or train shocks, will be prevented. It will further be seen that upon upward movement of a hook within its notch, if the hook should strike the guarding portion 16 of a notch and drop downwardly onto the opposite wall of the notch, the inclined construction of the wall of the notch will guide the hook to its seat, making it practically impossible for a hook to become accidentally displaced from its notch or bounced upwardly due to severe shocks and vibrations directed thereto while in transit.

It will further be seen that because of this construction, the longitudinal shifting of the hooks on the rails will be prevented and the quarters of beef hung on the hooks will be maintained in proper spaced relation with respect to each other against crowding toward either end of the car and overlapping of the beef suspended on the hooks, which condition contributes to the displacement of the hooks.

Figure 3:
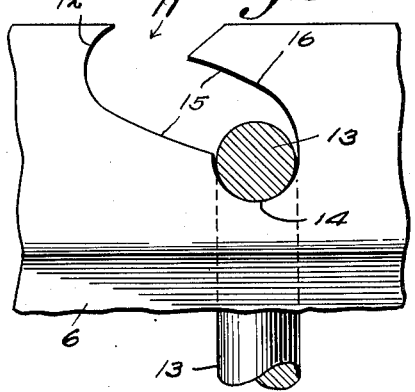
Fig. 3 is an enlarged elevational view illustrating the specific construction of the hook-receiving slots of the meat rail.

In the form of the invention as shown by Fig. 4 of the drawings, the reference character 17 indicates the base of the rail, which is inverted U-shape with a T-beam welded thereto, T-beam being indicated by the reference character 18. The stem portion 19 in this form of the invention, is extended upwardly, and is provided with hook retaining notches as previously indicated, and illustrated by Fig. 3.

Figure 8:
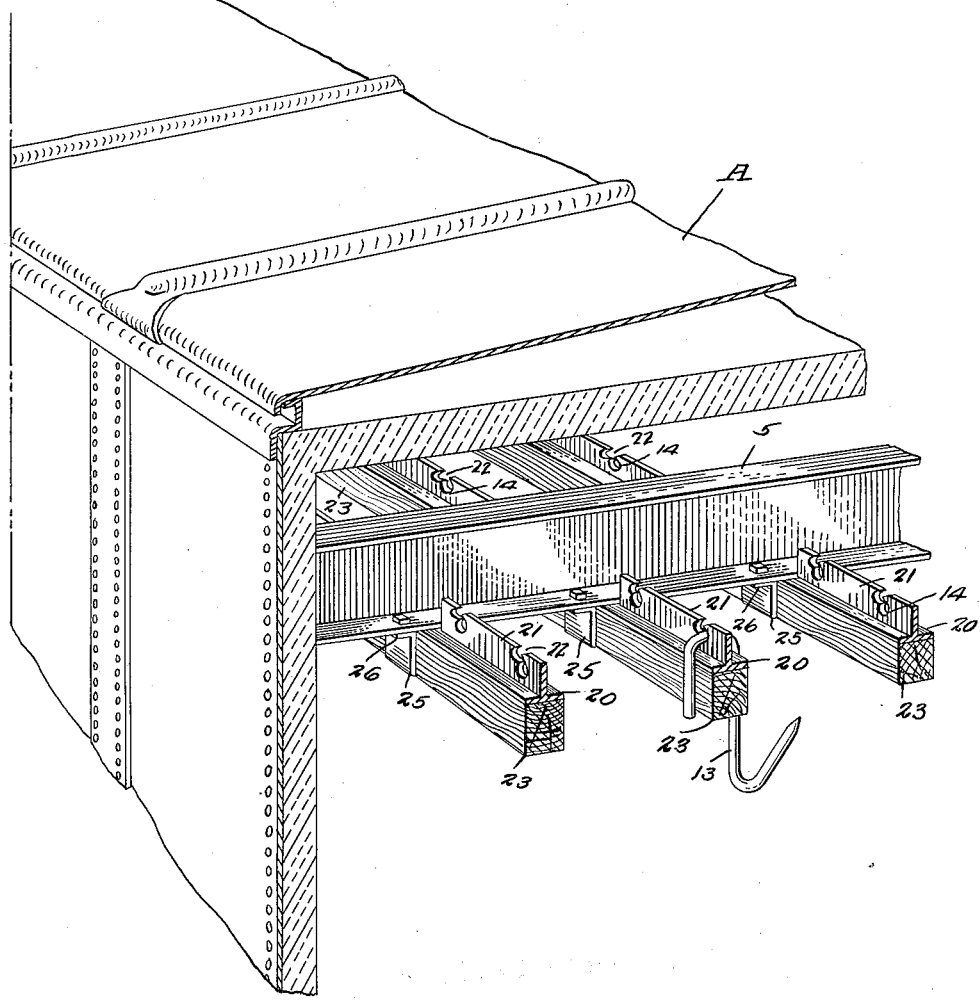
Fig. 8 is a fragmental perspective view illustrating a refrigerator car equipped with a metallic supporting rail constructed for mounting on the usual wooden supporting rail.
Figure 9:
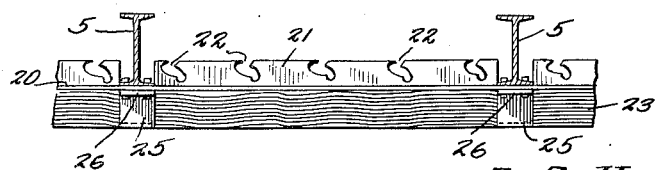
Fig. 9 is a sectional view illustrating the method of securing metallic rails to wooden rails.

As shown by Figs. 5, 6 and 8 of the drawings, the rail comprises the T-beam section 20 with the stem 21 thereof disposed inwardly and provided with notches 22 of a construction as previously described, for reception and securement of the meat hooks to be mounted on the rail.

In this form of the invention the T-beam is designed for positioning over the usual wooden rails or meat rails indicated at 23 and which are commonly used in refrigerator car construction. The rails in this form of the invention are secured to the transoms indicated at 24, by means of the straps 25 that are of U-shaped construction to fit around the beams 23, the laterally extended ends 26 of the straps being bolted to the lower flanges 27 of the transoms, which are of I-beam construction. With this structure the usual wooden meat supporting rails of a refrigerator car may be converted into reinforced supporting rails of wood-metal construction, thereby providing a structure with hook-receiving notches that are so constructed that the meat hooks positioned therein will be held against movement vertically and longitudinally of the rails and will be prevented from accidental displacement, due to sudden jars or shocks directed thereto, incident to the switching and coupling of cars. It will further be seen that because of the construction of the rails and hooks, the meat will be retained against swinging laterally while in storage or transit.

It might be further stated that it is contemplated and within the scope of the invention to construct the metal rail of any desired metal, such as aluminum-alloy, or other rust-proof or corrosive resistant metal eliminating deterioration of the meat due to a rust or corrosive condition of said rails.

Having thus described the invention, what is claimed is:

1. An overhead meat hook supporting rail comprising a body portion having an upstanding longitudinal flange, and an inverted U-shaped base, said flange having spaced notches formed therein, each notch embodying spaced rearwardly disposed walls continuing in forwardly and downwardly inclined parallel walls terminating in a curved meat hook seat, one wall of the notch overlying the meat hook seat guarding against accidental displacement of a meat hook positioned within the seat.

2. An overhead meat hook supporting rail comprising a body portion, an upstanding flange disposed longitudinally of the body portion, said flange having notches extending inwardly from the edge thereof, each notch having parallel spaced walls disposed at an oblique angle with respect to the edge of the flange, the notch terminating in a curved meat hook seat, offset with respect to the walls of the notch.

3. An overhead meat hook supporting rail comprising a body portion, an upstanding flange disposed longitudinally of the body portion, said flange having notches extending inwardly from the edge thereof, each notch having parallel spaced walls disposed at an oblique angle with respect to the edge of the flange, the notch terminating in a curved meat hook seat, offset with respect to the walls of the notch, with one wall of the notch overlying the curved meat hook seat in spaced relation therewith, guarding the hook seat.

4. An overhead meat hook supporting rail comprising a body portion having an upstanding longitudinal flange, and an inverted U-shaped base, said flange having spaced notches formed therein, each notch embodying spaced walls extended at substantially oblique angles with respect to the longitudinal edges of the rail towards one end of the rail, said walls of the notch continuing in parallel relation towards the opposite end of the rail, the walls of the notch terminating in a circular meat hook seat.

ALFRED A. HAMER.

REFERENCES CITED

The following references are of record in the file of this patent:

UNITED STATES PATENTS

| Number | Name | Date |
|---|---|---|
| 656,456 | Hirsch | Aug. 21, 1900 |
| 812,861 | Martin | Feb. 20, 1906 |
| 1,202,885 | Pierce, Jr. | Oct. 31, 1916 |
| 1,284,855 | Benn | Nov. 12, 1918 |
| 1,350,632 | Albrecht | Aug. 24, 1920 |
| 1,568,538 | Argo | Jan. 5, 1925 |
| 1,863,714 | Geiger | June 21, 1932 |
| 2,470,878 | Tate | May 24, 1949 |